United States Patent
Piche et al.

(10) Patent No.: US 7,522,594 B2
(45) Date of Patent: Apr. 21, 2009

(54) METHOD AND APPARATUS TO PERMIT DATA TRANSMISSION TO TRAVERSE FIREWALLS

(75) Inventors: Christopher Piche, West Vancouver (CA); Shahadat Khan, Burnaby (CA); Michael Chung, Gibsons (CA)

(73) Assignee: Eye Ball Networks, Inc., Vancouver, B.C. (CA)

( * ) Notice: Subject to any disclaimer, the term of this patent is extended or adjusted under 35 U.S.C. 154(b) by 536 days.

(21) Appl. No.: 11/220,539

(22) Filed: Sep. 8, 2005

(65) Prior Publication Data

US 2006/0056409 A1 Mar. 16, 2006

Related U.S. Application Data

(63) Continuation-in-part of application No. 10/468,439, filed on Aug. 19, 2003.

(51) Int. Cl.
*H04L 12/28* (2006.01)
(52) U.S. Cl. .......................................... 370/389; 726/11
(58) Field of Classification Search ........................ None
See application file for complete search history.

(56) References Cited

U.S. PATENT DOCUMENTS

| | | | |
|---|---|---|---|
| 5,793,763 A | 8/1998 | Mayes et al. | |
| 5,852,630 A | 12/1998 | Langberg et al. | |
| 6,055,236 A | 4/2000 | Nessett et al. | |
| 6,259,701 B1 | 7/2001 | Shur et al. | |
| 6,457,061 B1 * | 9/2002 | Bal et al. | 709/245 |
| 6,496,935 B1 | 12/2002 | Fink et al. | |
| 6,618,368 B1 | 9/2003 | Tanigawa et al. | |
| 7,051,369 B1 * | 5/2006 | Baba | 726/23 |
| 7,072,341 B2 * | 7/2006 | Xu et al. | 370/392 |
| 2002/0078198 A1 * | 6/2002 | Buchbinder et al. | 709/224 |
| 2003/0058839 A1 * | 3/2003 | D'Souza | 370/352 |
| 2003/0097589 A1 * | 5/2003 | Syvanne | 713/201 |
| 2004/0059942 A1 * | 3/2004 | Xie | 713/201 |
| 2005/0125532 A1 * | 6/2005 | Kimchi | 709/225 |
| 2006/0182108 A1 * | 8/2006 | Krumel | 370/389 |
| 2006/0212601 A1 * | 9/2006 | Hampton | 709/245 |
| 2007/0192508 A1 * | 8/2007 | Sollee | 709/245 |
| 2007/0214262 A1 * | 9/2007 | Buchbinder et al. | 709/224 |

OTHER PUBLICATIONS

Kegel, Dan; "NAT and Peer-to-peer Networking"; available on website http://alumnus.caltech.edu/dank/peer-nat.html.

Srisuresh, P. (Jasmine Networks); Egevang, K. (Intel Corporation); "Traditional IP Network Address Translator (Traditional NAT)"; on website http://tools.ietf.org/html/rfc3022.

Egevang, K. (Cray Communications); Francis P. (NTT); "The IP Network Address Translator (NAT)"; on website http://tools.ietf.org/html/rfc1631.

(Continued)

*Primary Examiner*—Phirin Sam

(57) ABSTRACT

Currently data transmission over the Internet between two client computers where both client computers are protected by firewalls is problematic, since firewalls block incoming packets. A method is provided for identifying the firewalls protecting a first client computer C1 protected by a first NAPT or NAT firewall and a second client computer C2 protected by a second NAPT or NAT firewall and allowing communications between the computers to traverse the first and the second firewalls.

11 Claims, 3 Drawing Sheets

OTHER PUBLICATIONS

Holdrege, M. (ipVerse); Srisuresh, P. (Jasmine Networks); "Protocol Complications with the IP Network Address Translator"; on website http;//tools.ietf.org/rfc/rfc3027.

Kegel, Dan (Linux IP NAT Forum); "NAT Support for Peer-to-Peer Games: a Proposal"; extract from Internet chat room: http://www.hasenstein.com/HyperNews/get/linux-ip-nat/97.htm.

O'Reilly & Associates; "Internet Core Protocols—the Definitive Guide"; ISBN: 1-56592-572-6, pp. 250-257.

Reitz, Andrew Joseph; "The Dynamic Port Reservation Protocol"; university thesis.

Schulzrinnne, H. (GMD Fokus) et al; "RTP: a Transport Protocol for Real-Time Applications"; on website http://tools.ietf.org/html/rfc1889.

Kostas et al; "Real-Time Voice over Packet-Switched Networks".

U.S. Appl. No. 10/311,324, filed Dec. 16, 2004, Kennedy et al.

U.S. Appl. No. 09/930,471, filed Mar. 14, 2002, Xu, Wei.

U.S. Appl. No. 09/788,865, filed Aug. 22, 2002, Liu et al.

Eschenburg A. "WO Laufen Sie Denn? ICQ Haelt Verbindung Zu Bekannten", Ct Magazin Fuer Computer Technik, Verlag Heinz Heise GMBH.. Hannover, DE, No. 22, Oct. 26, 1998, pp. 92-95.

Rosenberg J. et al "Getting SIP through Firewalls and NATs", Internet Draft, Feb. 22, 2000.

Tsuchiya P.F. et al. "Extending the IP Internet . . . ", Computer Communication Review, Association for Computing Machinery, NY, USA, vol. 1, No. 23, 1993, pp. 16-33.

* cited by examiner

METHOD AND APPARATUS TO PERMIT DATA TRANSMISSION TO TRAVERSE FIREWALLS

This application claims priority from previously filed U.S. Provisional Patent Application Ser. No. 60/269,357, filed Feb. 20, 2001 and is a continuation-in-part of U.S. patent application Ser. No. 10/468,439 filed Aug. 19, 2003, which is hereby incorporated by reference.

FIELD OF THE INVENTION

This invention relates to methods of allowing communication between computers employing security measures, and more particularly to identifying firewalls and NAT/NAPT devices and allowing communication between computers using firewalls.

BACKGROUND OF THE INVENTION

Computers connected to wide area networks like the Internet are commonly connected via NAT/NAPT devices and/or protected by firewalls. Firewalls are most commonly used to protect computers operating on local area networks, but they can also be used to protect individual computers, including servers, which access a wide area network. In this application, the term "client computer" will encompass any computer with access to a wide area network, and also a program operating on such a computer. Such a computer may, but need not, operate on a local area network, and may perform the functions of a server on the wide area network.

Firewalls typically perform a number of functions. They protect internal computers from outside computers on the wide area network, while allowing internal computers to access the wide area network. Firewalls can also make local network administration more efficient, by permitting a large number of client computers to share a limited pool of Internet Protocol (IP) addresses on the wide area network, and by accommodating changes within the local network without having to re-configure access to the other computers on the wide area network.

A firewall is typically a program or collection of related programs on a network gateway server, which check each network packet to determine whether to forward it to its destination. To create a barrier between an internal computer and the outside wide area network, firewalls commonly use NAT (network IP address translation) or NAPT (network IP address and port translation). NAT is the translation of an internal IP address used by a client computer (and known within the internal network, if the client computer is operating on one), to a different IP address known within the outside wide area network. The firewall maps internal IP addresses to one or more global external IP addresses, and reverse maps the external IP addresses on incoming packets back into internal IP addresses. NAPT is the translation of both internal IP addresses and internal ports to different external IP addresses and external ports known within the outside network. Firewalls using NAPT commonly screen incoming packets to make sure that they come from a previously identified IP address and port. That is, a request from a particular IP address and port traverses the firewall only if a request previously went out from the firewall to that IP address and port. As used in this document the term "translation device" will include NAT devices and NAPT devices, including routers and firewalls.

There are many types of firewalls and NAT/NAPT devices, and one major difference between such types is the way the firewalls or devices assign, or map, an external port. Some firewalls use the same external port for all packet destinations, other firewalls increment to the next external port for every new packet destination IP address, other firewalls use the same external port for the same packet destination host IP address, but increment to the next external port for a new packet destination host, and yet other firewalls use random algorithms to select an external port.

Data transmission over the Internet has become an everyday occurrence. Many Internet data transmissions are used to transport audio and/or video data from a live or on-demand streaming server to streaming clients, to provide real-time interactive communication (such as "chat") between client computers, to transport the contents of web-pages from web-servers to web-clients, and for many other types of communication among networked programs. Different protocols are used to transmit different types of data. For example, text chat is generally transmitted using Transmission Control Protocol (TCP), while audio/video conferencing and live audio/video streaming are generally transmitted using UDP (User Datagram Protocol). Communications through a server connected directly to the Internet (that is, not behind a firewall) are not generally obstructed by client-side firewalls; the act of logging on to a server generally opens a return path from the server through the firewall. However, firewalls commonly block direct client-to-client, or "peer-to-peer" communication. One attempted solution is to open certain ports in the firewall, but this solution (i) requires modification of the firewall settings, which most network administrators are reluctant to do, and (ii) does not work with firewalls that perform any sort of port translation. The present invention provides a method for permitting packet based data transmission to traverse firewalls using either NAPT or NAT without altering firewall settings. The invention is disclosed in the context of a firewall using NAPT, as the more general case. However, the method provided in the invention is equally applicable to a firewall using NAT, and also to other types of devices, such as routers, using either NAPT or NAT.

BRIEF SUMMARY OF THE INVENTION

The invention therefore provides a method for a client to identify the type of a translation device and to predict the next external port to be used by the translation device. The client begins by sending four data packets in two pairs, each pair addressed to two different server addresses, each packet in each pair also sent to different server ports at the selected server address. The servers detect the corresponding external ports from which the received packets were sent, and return that information to the client. The client then compares the external ports to determine the type of translation device in question. If the client receives the same external port for all destinations, then the translation device sends all outgoing messages through the same external port. If the external ports increment for each new destination (be it a server port or a new address), then the client can predict the next external port to be used will be the next increment. If the client receives the same external port for a particular destination server address (regardless of the destination port), but the server port is incremented for each new server address, then the client can predict that the external port will be incremented only for a new server address. If none of these external port patterns are determined, the translation device is likely following a random pattern of assigning external ports, and therefore the next external port cannot be predicted.

The invention further provides a method of transmitting a data packet from a first computer to a second computer over a wide area computer network, a data packet transmitted from the first computer having a first source address designating the first computer and a data packet transmitted from the second computer having a second source address designating the second computer, wherein the first computer is protected by a first firewall which translates the first source address to a first external address when transmitting a data packet from the first computer to the wide area network, and the second computer is protected by a second firewall which translates the second source address to a second external address when transmitting a data packet from the second computer to the wide area network, the first and second firewalls communicating over the wide area computer network, the method using a designated recipient computer in communication with the first and second computers via the wide area computer network, said method comprising: a) the first and second computers sending first and second data packets to the designated recipient computer; b) the designated recipient computer communicating the first external address from the first data packet to the second computer and communicating the second external address from the second data packet to said first computer; c) the second computer sending a data packet to the first external address; and d) the first computer sending a data packet to said second external address.

The method further provides for two-way transmission of data by additionally having the second computer then send a data packet to the first external address. The method can be applied to a plurality of computers protected by firewalls communicating over a wide area network. The firewalls may be NAT or NAPT. In particular the method works if the IP address and port are translated at the firewall, or only the IP address. The designated recipient computer can be any type of computer, including without limitation a designated server, a peer computer involved in the data transmission, or a peer computer not involved in the data transmission.

The invention also provides for a method of transmitting a first data packet from a first computer to a second computer over a wide area computer network, said first computer having a first internal network address and a first designated internal port from which it will transmit the UDP data packet and said second computer having a second internal network address and a second designated internal port at which it will receive the UDP data packet, wherein said first computer is protected by a first firewall which translates said first internal network address to a first external network address and said first internal network port to a first external network port when communicating over said wide area computer network, and said second computer is protected by a second firewall which translates said second internal network address to a second external network address and said second internal network port to a second external network port when communicating over said wide area computer network, said first and second firewalls communicating over said wide area computer network, said method comprising: (a) the first computer identifying the type of the first firewall and the second computer identifying the type of the second firewall; (b) the first computer predicting the first external network port to be used by the first firewall when the first computer sends the first packet to the second computer and the second computer predicting the second external network port to be used by the second firewall to receive the first packet from the first computer; (c) said first computer transmitting the first external network address and the predicted first external network port to be used to send the first data packet to said second computer; (d) the second computer transmitting the second external network address and the predicted second external network port to receive the first data packet to the first computer; (e) the second computer sending a second data packet to said first computer at said first external network address and said predicted first external network port; and (f) said first computer sending said first data packet to said second computer at said second external network address and said predicted network port.

Step (a) of the method may include the steps: (a.1) said first computer sending four packets, two packets each to first and second servers, each packet addressed to respective first and second ports on one of said servers; (a.2) said first and second servers detecting an external port from which each of said packets was sent and sending that information back to said first computer; (a.3) said first computer comparing each of said four external ports from which said packets were sent and if: (a.3.i) each of said external ports are the same, identifying the first firewall as a fixed mapping firewall; (a.3.ii) if each of said external ports is one greater than the previously sent external port, identifying the first firewall as an incremental mapping firewall; (a.3.iii) if each of said external ports from which packets were sent to said first server are the same and are an increment difference from each of said external ports from which packets were sent to said second server, identifying said first firewall as a mixed mapping firewall; and (a.3.iv) if none of (a.3.i) to (a.3.iii) occurs, identifying the first firewall as an unpredictable mapping firewall.

Step (a) may further include: (a.4) said second computer sending four packets, two packets each to third and fourth servers, each packet addressed to respective first and second ports on one of said servers; (a.5) said third and fourth servers detecting an external port from which each of said packets was sent and sending that information back to said second computer; (a.6) said second computer comparing each of said four external ports from which said packets were sent and if: (a.6.i) each of said external ports are the same, identifying the second firewall as a fixed mapping firewall; (a.6.ii) if each of said external ports is one greater than the previously sent external port, identifying the second firewall as an incremental mapping firewall; (a.6.iii) if each of said external ports from which packets were sent to said third server are the same and are an incremental difference from each of said external ports from which packets were sent to said fourth server, identifying said second firewall as a mixed mapping firewall; and (a.6.iv) if none of (a.6.i) to (a.6.iii) occurs, identifying the second firewall as an unpredictable mapping firewall.

The method may include said data packet sent from said first computer to said second computer being part of a UDP data stream. The method may also include, if said second firewall blocks said packet from said first computer, said second computer uses a source address:port of said packet to send a dummy packet to said first computer.

The invention further provides for a method for a computer to identify a type of a firewall protecting the computer, comprising: (a) the computer sending a first packet to a first server at a first address and a first port; a second packet to said first server at a first address and a second port; a third packet to a second server at a second address and a third port; and a fourth packet to said second server at said second address and a fourth port; (b) said first server sending a first message to the computer, said first message containing a first external port from which the computer sent said first packet, and a second external port from which said computer sent said second packet; (c) said second server sending a second message to the computer, said second message containing a third external port from which the computer sent said third packet, and a fourth external port from which the computer sent said fourth packet; (d) said computer comparing said first, second, third and fourth external ports to determine the type of firewall protecting said computer.

Step (d) of the method may include, if the computer determines said first external port equals said second external port which equals said third external port which equals said fourth external port, then the firewall is determined to be a fixed mapping firewall. Step (d) may further include, if the computer determines that said second external port is an increment greater than said first external port; and said third external port is said increment greater than said second external port; and said fourth external port is said increment greater than said third external port then the firewall is determined to be a incremental mapping firewall. Step (d) may yet further include, if the computer determines that said first external port equals said second external port, said third external port equals said fourth external port; and said third external port is one greater than said first external port, then said firewall is determined to be a mixed mapping firewall.

The invention further provides for a computer program product for transmitting a first data packet from a first computer to a second computer over a wide area computer network, said first computer having a first internal network address and a first designated internal port from which it will transmit the UDP data packet and said second computer having a second internal network address and a second designated internal port at which it will receive the UDP data packet, wherein said first computer is protected by a first firewall which translates said first internal network address to a first external network address and said first internal network port to a first external network port when communicating over said wide area computer network, and said second computer is protected by a second firewall which translate said second internal network address to a second external network address and said second internal network port to a second external network port when communicating over said wide area computer network, said first and second firewalls communicating over said wide area computer network, said program comprising: (a) a computer usable medium having computer read-able program code means embodied in the medium for causing the first computer to identify the type of the first firewall and the second computer to identify the type of the second firewall; (b) the computer usable medium having computer read-able program code means embodied in the medium for causing the first computer to predict the first external network port to be used by the first firewall when the first computer sends the first packet to the second computer and the second computer to predict the second external network port to be used by the second firewall to receive the first packet from the first computer; (c) the computer usable medium having computer read-able program code means embodied in the medium for causing the first computer to transmit the first external network address and the predicted first external network port to be used to send the first data packet to said second computer; (d) computer usable medium having computer read-able program code means embodied in the medium for causing the second computer to transmit the second external network address and the predicted second external network port to receive the first data packet to the first computer; (e) computer usable medium having computer read-able program code means embodied in the medium for causing the second computer to send a second data packet to said first computer at said first external network address and said predicted first external network port; and (f) computer usable medium having computer read-able program code means embodied in the medium for causing said first computer to send said first data packet to said second computer at said second external network address and said predicted network port.

The invention further provides for a method for a computer to identify a firewall, including: (a) said computer sending a plurality of packets to first and second servers, each packet addressed to a different port on one of said servers; (b) said first and second servers detecting an external port from which each of said packets was sent and sending that information back to said computer; (c) said computer comparing each of said external ports from which said packets were sent and if: (c.i) each of said external ports are the same, identifying the firewall as a fixed mapping firewall; (c.ii) if each of said external ports is one greater than the previously sent external port, identifying the firewall as an incremental mapping firewall; (c.iii) if each of said external ports from which packets were sent to said first server are the same and are an incremental difference from each of said external ports from which packets were sent to said second server, identifying said firewall as a mixed mapping firewall; (c.iv) if none of (c.i) to (c.iii) occurs comparing said external ports from which said packets were sent and determining the pattern thereof, such that a next external port is predictable; and (c.iv) if none of (c.i) to (c.iv) occurs, and said next external port is not predictable, identifying the first firewall as an unpredictable mapping firewall.

The invention further provides a method of transmitting a first data packet from a first computer to a plurality of computers over a wide area computer network, said first computer having a first internal network address and a first designated internal port from which it will transmit the UDP data packet and each of said plurality of computers having an associated internal network address and a designated internal port at which it will receive the UDP data packet, wherein said first computer is protected by a first firewall which translates said first internal network address to a first external network address and said first internal network port to a first external network port when communicating over said wide area computer network, and each of said plurality of computers is protected by an associated firewall which translate said computer's associated internal network address to an associated external network address and said associated internal network port to an associated external network port when communicating over said wide area computer network, said first and plurality of firewalls communicating over said wide area computer network, said method comprising: (a) the first computer identifying the type of the first firewall and each of said plurality of computers identifying the type of the computer's associated firewall; (b) the first computer predicting the first external network port to be used by the first firewall when the first computer sends the first packet to the plurality of computers and each of said computers in the plurality of computers predicting the associated external network port to be used by the associated firewall to receive the first packet from the first computer; (c) said first computer transmitting the first external network address and the predicted first external network port to be used to send the first data packet to each computer in the plurality of computers; (d) each computer in the plurality of computers transmitting the associated external network address and the predicted associated external network port to receive the first data packet to the first computer; (e) each computer in the plurality of computers sending a second data packet to said first computer at said first external network address and said predicted first external network port; and (f) said first computer sending said first data packet to each computer in said plurality of computers at said associated external network address and said predicted network port.

The present invention further provides a computer program product for carrying out the foregoing method, and a system for transmitting a data packet between two firewall-protected computers over a wide area network.

DETAILED DESCRIPTION OF THE INVENTION

The method and system provided are for the identification of the firewall and other translation devices type and the prediction of the next external port to be selected by the firewall or other translation device. While the invention will be described following with respect to firewalls, the system and method according to the invention are also applicable to the identification of the type of other translation devices, including NAT or NAPT devices.

Firewalls only permit an incoming UDP packet to pass if (i) its source and destination IP addresses match the destination and source IP addresses, respectively, of a recent outgoing UDP packet, and (ii) its source and destination ports match the destination and source ports, respectively, of a recent outgoing UDP packet.

The addresses referred to within this document as "network addresses", "destination addresses" and the like, in a preferred embodiment of the invention, are Internet protocol (IP) addresses, although the invention is applicable to other addresses supported by other protocols.

Figure 1:
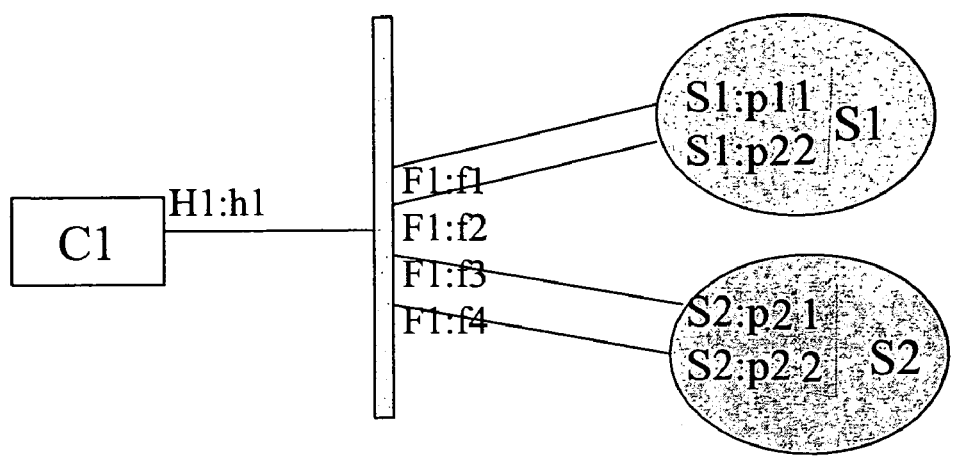
FIG. 1 is a schematic diagram illustrating a preferred embodiment of the system for identifying the type of firewall.

FIG. 1 schematically illustrates a client computer C1 protected by a NAPT firewall (F1), sending a pair of data packets to each of two servers S1 and S2, each data packet addressed to a different address-port pair S1:p11; S1:p12; S2:p21; and S2:p22. Firewall F1 will select an external port f1, f2, f3, or f4 for each data packet.

With reference to FIG. 1, the method of identifying the firewall type proceeds as follows:

(A) The client C1 sends four packets (for example a UDP packet), two each to different external UDP servers, S1 and S2, and addressed to the address:port pairs S1:p11, S1:p12, S2:p21 and S2:p22. S1 and S2 are the server IP addresses, p11 and p12 are server ports at S1 and p21 and p22 are server ports at S2.

(B) Each of the servers S1, S2 detects the corresponding external port f1, f2, f3 or f4 on a packet, and sends that information back to client C1.

(C) Client C1 compares ports f1, f2, f3 and f4 to identify the category/type of the firewall based on the following:

If f1=f2=f3=f4 (i.e. client C1 gets same external port for all destination IP address:port pairs) the firewall is of the type that maps a consistent port (herein referred to as a "fixed mapping firewall");

If f2=f1+1, f3=f2+1 and f4=f3+1 (i.e. the external port increments for every new IP address:port pair), the firewall type is of the type that maps an incremental port (herein referred to as "incremental mapping firewall");

If f1=f2, f3=f4 and f3=f1+1 (i.e. the port is the same if the destination server IP address was the same, regardless of the destination port, but the external port increments for a new destination server address), then the firewall is of the type that maps an incremental port only for a new destination server IP address (herein referred to as a "mixed mapping firewall"); and If none of the above occurs, the next port is not predictable and the firewall is of the type that assigns a random port (herein referred to as a "unpredictable mapping firewall").

Firewalls categorized using the above method usually use the same external port mapping pattern with all destination addresses and ports. Once the firewall type is identified and the firewall is not an unpredictable mapping firewall, client C1 can predict what external port its firewall F1 will allocate when it sends a UDP packet to another destination IP address: port pair. This prediction can then be used for traversal of UDP packets through firewall F1 (as described below). However if firewall F1 is identified as an unpredictable mapping firewall, the method will work only if the recipient computer is not behind another unpredictable mapping firewall.

Alternatively, rather than C1 sending out four packets to determine the type of firewall, it may be preferable for C1 to send out a larger number of packets. Certain types of firewalls may not be predictable based on the knowledge of only four ports, f1, f2, f3 and f4, and additional ports f5, f6 . . . to fN may be necessary, after which C1 will determine the next predicted port. In such cases, N should be preset to a specified limit, as in the case where the firewall is an unpredictable mapping firewall, no amount of ports will allow determination of a pattern of another type of firewall. Therefore to prevent N from approaching infinity, and value of N should be selected at which the firewall will be designated an unpredictable mapping firewall.

The terms "fixed mapping firewall", "incremental mapping firewall", "mixed mapping firewall" and "unpredictable mapping firewall" are also applicable to other translation devices and the terms "fixed mapping translation device", "incremental translation device", "mixed mapping translation device" and "unpredictable mapping translation device" have the same meanings for the particular NAT or NAPT device as does the corresponding term for a firewall type.

For example, suppose a client computer C1 wants to send a UDP packet stream to client computer C2. This may be achieved, in summary, as follows:

1. C1 and C2 each identify their respective local firewall (F1 and F2 respectively) types using the above method.

2. C1 predicts the external port f1 that F1 will use if C1 was to send a UDP packet to C2, and tells C2 that it will use the IP address:port F1:f1 to send UDP packets.

3. C2 predicts the external port f2 that F2 will use if C2 was to send a UDP packet to C1, and tells C1 that it will use the IP address:port F2:f2 to receive UDP packets.

4. C2 sends a UDP packet to F1:f1. This allows C2's firewall F2 to receive messages from F1:f1 and creates a mapping in C2's firewall F2 so that UDP packets from C1 will not be blocked any more. However since C1's firewall F1 does not yet have mapping for C2 yet, this UDP packet may not reach C1.

5. C1 can now send UDP packets to C2 by using destination IP address F2:f2.

An example of the above method of identifying the type of firewall follows:

EXAMPLE #1

C1's firewall, F1, is an incremental mapping firewall (i.e. a firewall that increments the external port for each destination IP address:port combination). C1 proceeds according to the method and receives messages from servers S1 and S2 that f1=6603, f2=6604, f3=6605 and f4=6606. Therefore the next predicted external port would be 6607.

C2's firewall, F2, is a mixed mapping firewall (i.e. a firewall that increments the external port for each new destination IP address, but not destination port with a previous IP address). C2 proceeds according to the method and receives f1=f2=4304, f3=f4=4305=f1+1. Therefore the next predicted external port for a new destination IP address (such as C1) will be 4306.

For this case, the above firewall traversal method begins by C1 telling C2 that it will use the next predicted external IP address:port F1:6607 to send the packet stream. C2 tells C1 that it will use the next predicted external IP address:port F2:4306 to receive the packets. C2 then sends a packet to IP address:port F1:6607. This allows C2's firewall F2 to accept messages from the IP address:port F1:6607 so that C1 can send data back. C1 the sends UDP packets destined for C2 using destination IP address:port F2:4306.

The above method can also be used to establish two-way communication between client computers C1 and C2 by combining the sender and receiver steps at each client. However it is possible that the destination IP address:port is predicted wrongly by one of the clients (for example if one of the firewalls F1 or F2 is an unpredictable mapping firewall). As an example if C1 predicted F1:f1 and C2 predicted F2:f2 for their respective external IP addresses and ports, however C1's predictions were incorrect, then UDP packets from C1 may reach C2 but UDP packets from C2 may not reach C1.

This problem may be solved by at C2 using the source IP address:port of received packets from C1 as the destination IP address:port for packets it wants to send to C1. This may also be used for one-way packet delivery applications by setting up a two-way data transfer where the packets in one direction carry fewer dummy packets with empty payloads. This technique is very useful if one of C1 and C2 is behind an unpredictable mapping firewall, and the other is not behind an unpredictable mapping firewall.

When establishing a packet stream, such as a UDP packet stream, it is also useful for both the sender and receiver clients to share their local IP address (that they can detect using an operating system call) and port and firewall IP address and port. If the external IP address of both the sender and receiver clients is the same, then both the sender and receiver clients are behind the same firewall. In this case the sender and receiver can use their local IP addresses and ports to send UDP packets to the other instead of using external IP addresses and ports (i.e. the firewall is bypassed).

The method of permitting data transmission to traverse firewalls will be shown in the case where both firewalls are fixed mapping firewalls (i.e. use a consistent external port). The method described below could be easily modified in the case where one or both of the firewalls are incremental mapping or mixed mapping firewalls. Furthermore, the method will be described in association with UDP packets but the same method can be used for transmission of data packets through other protocols such as TCP and other connectionless or datagram-type transmission protocols other than UDP.

Figure 2:
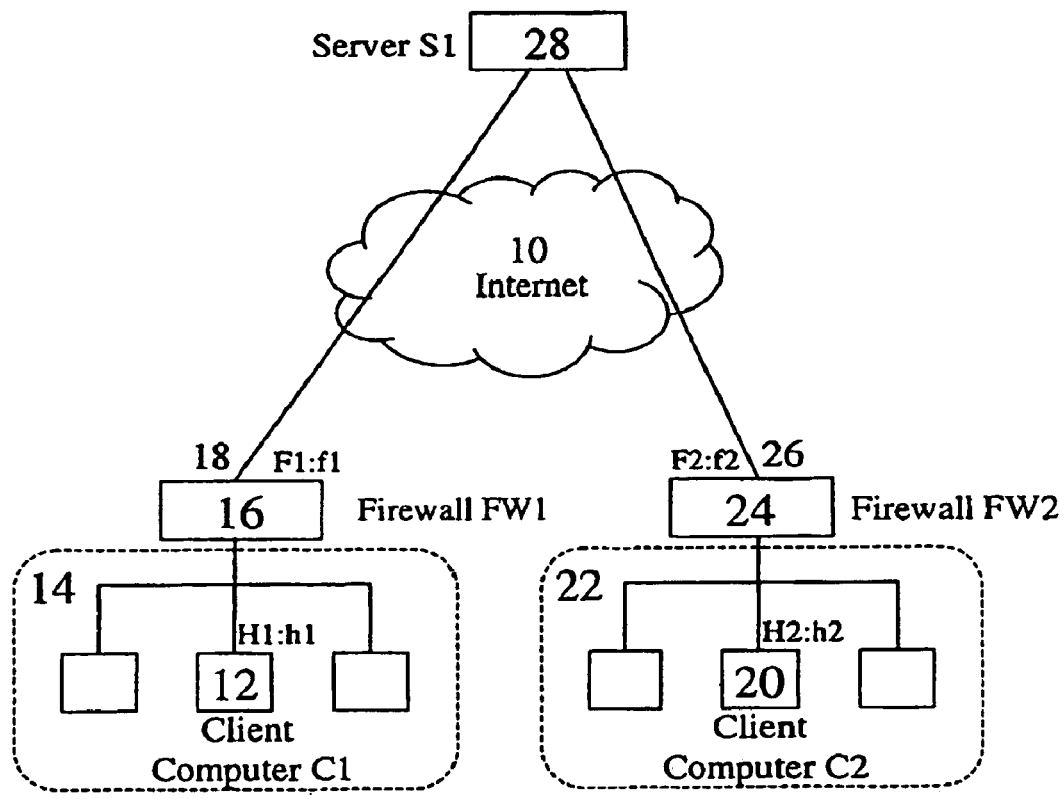
FIG. 2 is a schematic diagram illustrating a preferred embodiment of the system for permitting data transmission to traverse firewalls.
Figure 3:
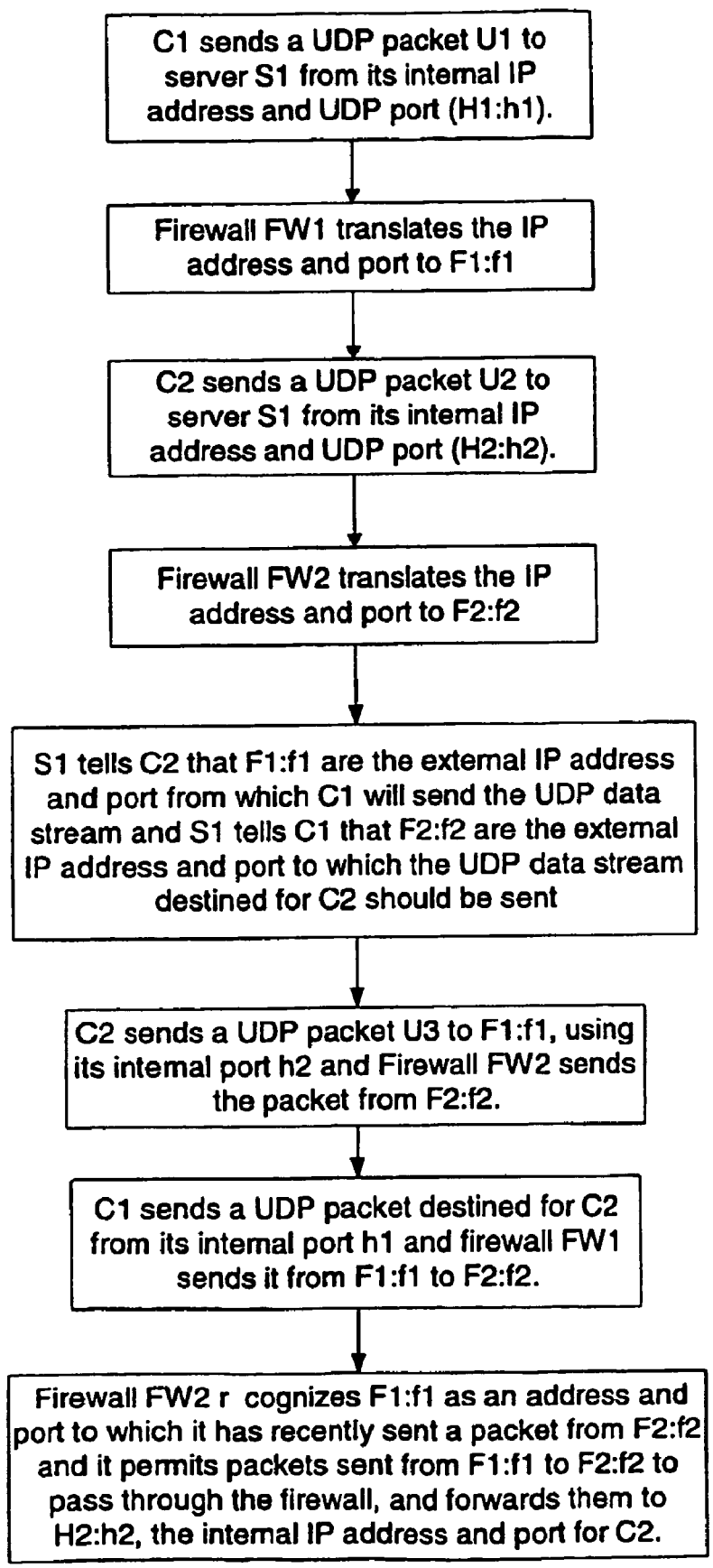
FIG. 3 is a flowchart illustrating a preferred embodiment of the steps taken when permitting data to transmission to traverse a firewall.

FIG. 2 schematically illustrates a client computer C1 (12) on local area network (14), protected by NAPT firewall F1 (16), wishing to send a UDP data stream, such as a live video data stream, over Internet 10, to client computer C2 (20) on local area network (22), protected by NAPT firewall F2 (24). Within this schematic, C1 has internal IP address H1, and will use internal port h1 to transmit the UDP data stream. Firewall F1 translates these into external IP address F1 and external port f1 (18). C2 has internal IP address H2, and will use internal port h2 to receive the UDP data stream. Firewall F2 will receive UDP packets destined for C2 at external IP address F2 and external port f2 (26). Both C1 and C2 log onto a server S1 (28), whose purpose is to establish a path to transmit the UDP data stream from C1 to C2. However, the UDP data stream is not transmitted through the server. It is sent client-to-client to take advantage of efficiencies and scalability that can be realized from peer-to-peer communication over the Internet. For C1 and C2 to determine the type of firewalls F1 and F2, respectively, they will need to use at least an additional server S2 (not shown).

Peer-to-peer communications are prevented by almost all firewalls. NAPT firewalls F1 and F2 will only permit an incoming UDP packet to pass if (i) its source and destination IP addresses match the destination and source IP addresses, respectively, of a recent outgoing UDP packet, and (ii) its source and destination ports match the destination and source ports, respectively, of a recent outgoing UDP packet. If either C1 or C2 attempts to send a packet to the other, the receiver's firewall will block the incoming packet if it does not meet these criteria.

The present invention permits C1 to send a UDP data stream to C2 by the following steps:

EXAMPLE #2

(1) C1 sends a UDP packet U1 to server S1. C1 initiates the transmission from its internal IP address and UDP port (H1: h1). Firewall F1 translates the IP address and port to F1:f1 at the external interface of F1. If firewall F1 is not an fixed mapping firewall, C1 will provide S1 the next predicted external port, in which case f1 will represent that next predicted external port.

(2) When S1 receives packet U1 from F1:f1, S1 can identify F1 and f1 (or the next predicted external port) as the external IP address and external port from which F1 will send the UDP data stream originating with C1.

(3) C2 sends a UDP packet U2 to server S1. C2 initiates the transmission from its internal IP address and UDP port (H2: h2). Firewall F2 translates the IP address and port to F2:f2 at the external interface of F2. If firewall F2 is not a fixed mapping firewall, C2 will provide S1 the next predicted external port, in which case f2 will represent the next predicted external port.

(4) When S1 receives packet U2 from F2:f2, S1 can identify F2 and f2 as the external IP address and external port at which F2 will receive the UDP data stream to be transmitted from C1 to C2.

(5) S1 tells C2 that F1:f1 are the external IP address and port from which C1 will send the UDP data stream.

(6) S1 tells C1 that F2:f2 are the external IP address and port to which the UDP data stream destined for C2 should be sent.

(7) C2 sends a UDP packet U3 to F1:f1, using its internal port h2. Firewall F2 will send the packet from F2:f2. This packet will be blocked by firewall F1. However, as described in step (8), it will prompt firewall F2 to pass subsequent packets sent by C1 destined for C2.

(8) When C1 subsequently sends a data stream consisting of UDP packets destined for C2 from its internal port h1, firewall F1 will send them from F1:f1 to F2:f2. Because of the packet sent in step (7), firewall F2 recognizes F1:f1 as an IP address and port to which it has recently sent a packet from F2:f2. Accordingly, it permits packets sent from F1:f1 to F2:f2 to pass through the firewall, and forwards them to H2:h2, the internal IP address and port for C2.

In the above described manner, the invention creates a means by which UDP data streams originating with C1 pass through to C2. This can be used for streaming applications, in which C1 sends a live or on-demand data stream to C2. Steps similar to (1) to (8), carried out vice versa, will permit UDP data streams originating with C2 to pass through firewall F1, to C1. Thus, C1 and C2 can utilize applications which depend on two-way transmission of UDP data streams, such as video conferencing. Similar steps carried out by a number of client computers, C1, . . . , CN, will permit one-to-many, many-to-one, or many-to-many transmission of UDP data streams through NAPT firewalls.

For the method to work with a firewall using NAPT, the packets sent in steps (1) and (3) will generally have to be of the same type (i.e. TCP, UDP, etc.) as the type used to transmit the data in step (8). The reason is that many computer applications or firewalls use different ports to transmit and receive different types of data. However, if that is not the case, the packets sent in steps (1) and (3) need not be of the same type as the type used in step (8). Also the method described above to identify the type of firewall protecting the client could be used to determine the ports used to transmit and receive the particular type of packet. This port used to send and receive the particular type of packet would be the predicted port, f1 or f2 accordingly, throughout steps (1) through (8) above.

In addition, firewall F1, in example #2 above, is a fixed mapping firewall, and uses the same external IP address and port to send the initial packet in step (1) as it uses subsequently to commence sending the data to C2 in step (8) (although the method can be adapted to accommodate subsequent changes in the IP addresses and ports, as described previously). This generally happens in practice so long as the software at client computer C1 is written to send both transmissions from the same internal IP address and port, as most firewall programs using NAPT currently create one-to-one mappings between internal IP addresses and ports and external IP addresses and ports used to send the same type of packet. Similarly, firewall F2, in the example above is a fixed mapping firewall, and uses the same external IP address and port to send the packet in step (3) that it will use to commence receiving the data in step (8). This also will generally happen in practice, so long as the software at client computer C2 is written to send the packet in step (3) from, and to receive the data in step (8) at, the same internal IP address and port.

Figure 4:
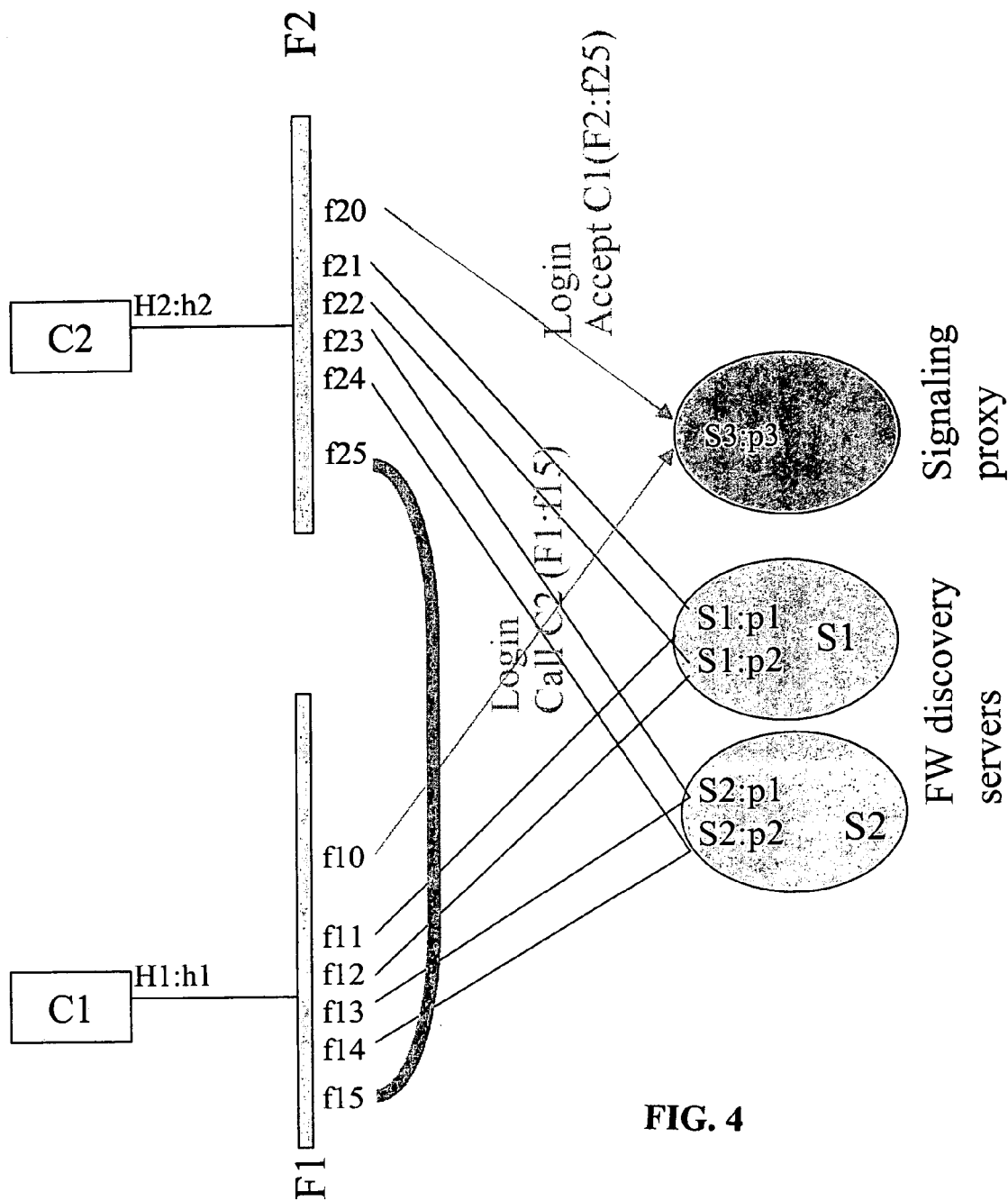
FIG. 4 is a schematic diagram illustrating a preferred embodiment of the system for identifying the type of firewall and permitting data transmission to traverse the firewall.

The following example, with reference to FIG. 4, illustrates the means by which the present invention permits C1 to send a UDP data stream to C2, when F1 and F2 are unknown types of firewalls. S1 and S2 represent server computers that assist C1 and C2 to classify/categorize firewalls F1 and F2. Server S3 is a signalling server (such as SIP proxy server). The present invention permits the sending of the data stream by the following steps:

EXAMPLE #3

(1) C1 sends a registration-request packet to proxy server S3 from its internal IP address and UDP port (H1:h1). Firewall F1 translates the IP address and port to F1:f10 at the external interface of F1.

(2) C2 sends a registration-request packet to proxy server S3 from its internal IP address and UDP port (H2:h2). Firewall F2 translates the IP address and port to F2:f20 at the external interface of F2.

(3) C1 sends a packet to each of four external UDP servers IP address:port pairs S1:p1, S1:p2, S2:p1 and S2:p2. S1 and S2 are server IP addresses, p1 and p2 represent server ports at S1 and S2.

(4) Each of the servers S1, S2 detects the corresponding external port f11, f12, f13 or f14, from which the packet from C1 were sent and sends that information back to client C1.

(5) Client C1 compares ports f11, f12, f13 and f14 to identify the category/type of F1 based on the following:

If f11=f12=f13=f14 then F1 is a fixed mapping firewall;
If f12=f11+1, f13=f12+1 and f14=f13+1 then F1 is an incremental mapping firewall;
If f11=f12, f13=f14 and f13=f11+1 then F1 is a mixed mapping firewall; and
If none of the above occurs, then F1 is an unpredictable mapping firewall.

(6) C2 sends a packet to each of four external UDP servers IP address:port pairs S1:p1, S1:p2, S2:p1 and S2:p2.

(7) Each of the servers S1, S2 detects the corresponding external port f21, f22, f23 or f24, from which the packet from C2 were sent and sends that information back to client C2.

(8) Client C2 compares ports f21, f22, f23 and f24 to identify the category/type of F2 based on the following:

If f21=f22=f23=f24 then F2 is a fixed mapping firewall;
If f22=f21+1, f23=f22+1 and f24=f23+1 then F2 is an incremental mapping firewall;
If f21=f22, f23=f24 and f23=f21+1 then F2 is a mixed mapping firewall; and
If none of the above occurs, then F2 is an unpredictable mapping firewall.

(9) C1 calls C2 by sending a call-request packet to proxy server S3. C1 initiates the transmission from its internal IP address and port (H1:h1) and reuses the IP address and port F1:f10 at the external interface of FW1. In the call-request packet, C1 will provide the next predicted external port to be used by F1, namely f15, for communication with C2.

(10) When S3 receives this call-request packet from F1:f10, S3 forwards this packet to C2 using the previously identified address and port F2:f20.

(11) C2 accepts C1's call by sending a call-acceptance packet to proxy server S3. C2 initiates the transmission from its internal IP address and UDP port (H2:h2) and therefore uses IP address and port F2:f20 at the external interface of F2. In the call-acceptance packet, C2 will provide the next predicted external port to be used by F2, namely f25, for communication with C1.

(12) When S3 receives the call-acceptance packet from F2:f20, S3 forwards this to C1 using the previously identified address and port F1:f10.

(13) C2 sends a packet to F1:f15, using its internal port h2. Firewall F2 will send the packet from F2:f25. This packet will be blocked by firewall F1. However, as described earlier, it will prompt firewall F2 to pass subsequent packets sent by C1 destined for C2.

(14) When C1 subsequently sends a data stream consisting of packets destined for address and port F2:f25 from its internal port h1, firewall F1 will send them from F1:f15 to F2:f25. Because of the packet sent in step (15), firewall F2 recognizes F1:f15 as an address and port to which it has recently sent a packet from F2:f25. Accordingly, it permits packets sent from F1:f15 to F2:f25 to pass through the firewall, and forwards them to H2:h2, the internal IP address and port for C2.

As will be apparent to those skilled in the art, the method can be readily adapted to support two-way data transmission between C1 and C2, to support one-to-many data transmission from C1 to client computers C2, . . . , CN, to support many-to-one data transmission from client computers C2, . . . , CN to C1, or to support many-to-many data transmission among client computers C1, . . . , CN. As well, the invention has been described with both C1 and C2 protected by firewalls, as that situation provides the clearest description of the invention. However, the method is readily adapted to the situation where only the receiving client computer is protected by a firewall.

The designated recipient and sending computers can be any type of computer, including without limitation a designated server, a peer computer involved in the data transmission, or a peer computer not involved in the data transmission.

As will be apparent to those skilled in the art in light of the foregoing disclosure, many alterations and modifications are possible in the practice of this invention without departing from the spirit or scope thereof. For example, the possible alterations and modifications include, but are not limited to, the following:

1. For robustness against packet loss or delay, C1 and/or C2 could send multiple packets to S1 in steps (1) and (3), instead of a single packet. Packets could be sent until confirmation is received that S1 has received one of the packets.

2. Also for robustness against packet loss or delay, C2 could send multiple packets in step (7), instead of a single packet. Packets could be sent until confirmation is received that FW1 has received one of the packets.

3. The method can also be used when either C1 or C2 uses separate ports for sending and receiving UDP data streams. For example, if C1 uses h1 for sending UDP data streams and h3 for receiving data streams, firewall F1 will translate these into f1 and f3 respectively. C2 would have to send a UDP packet from its receiving port to f1, and C1 would have to send a UDP packet from f3 to the sending port for C2. These packets would open paths over which C1 could send to C2 (through f1), and over which C2 could send to C1 (through f3).

4. In the case of two-way communication, and where firewalls F1 and F2 use the same external ports for both sending and receiving UDP data, the initial data packets in the data streams can be used as the packets required to open the paths (as in step (7) in Example #2). The initial data packets may be blocked, until a data packet is sent in the other direction. However, applications using UDP transmissions are typically robust against packet loss, and the method should succeed so long as loss of the initial data packet or packets is not critical to the application in question.

5. If firewall F1 (or F2) changes the external IP address or port which it uses to transmit UDP data for any reason (such as a long data transmission or period of silence), the method can be adapted to refresh the data identifying the external IP addresses and ports, to maintain open transmission paths. For example, if F1 changes the external IP address or port used to transmit UDP data originating from C1, new packets will be sent periodically to the intermediary server S1 as in step (1), above, to identify any new IP address or port being used by F1. The remaining steps (2) through (8) can then be repeated using new data. All that the method requires is that the same external sending IP address and port be used by F1 for a long enough period of time that the initial packet sent to S1 in step (1) come from the same IP address and port as the initial data packets in the UDP data stream.

6. In the best mode described above, server S1 is used as intermediary to receive UDP packets originating from C1 and C2, and to use information contained in those packets to identify the external ports being used by F1 and F2. However, any other means for informing each terminal of the other's external ports will also work according to the invention. For example, C1 and C2 could use different echo servers, S1 and S2, which return any UDP packet to its source. This will permit C1 and C2 to identify F1:f1 and F2:f2, respectively. C1 and C2 could use any other means, such as off-line exchange of information by the users, or TCP transmissions either directly to the other or through a common server, to inform each other about F1:f1 and F2:f2.

7. The method can be used where client computers communicate through a server computer, although the method is not usually needed in that case, as a client computer generally opens a return path from the server when it logs on to the server.

8. The method can also be used where only the receiving client computer is behind a firewall, but there is no firewall protecting the sending client computer.

9. Although the above method has been described in the context of real-time audio and video communications using UDP packets, it will be apparent to those skilled in the art that the method has application to other forms of packet based data transmission.

10. The method can also be adapted to firewalls which do not create one-to-one mappings between internal and external IP addresses and ports, by deducing the mapping scheme from received packets, and then utilizing the deduced mapping schemes to send the required packets from the external receiving IP addresses and ports of each client computer to the external sending IP addresses and ports of each other client computer.

11. While the invention has been disclosed in connection with a NAPT firewall, it would also operate in the same manner if firewalls F1 and F2 are NAT firewalls. In that case, NAT F1 would translate H1:h1 to F1:h1, and NAT F2 would translate H2:h2 to F2:h2. The method would otherwise be identical.

12. While the invention has been described in connection with the identification of a type of firewall, the invention is also applicable to the identification of other NAT or NAPT devices, besides firewalls.

13. While the invention has been described in connection with IP addresses, the method and system according to the invention are also applicable to other addresses supported by other protocols, and the term "address", unless otherwise qualified as an IP address or the like, should be interpreted broadly.

Although the particular preferred embodiments of the invention have been disclosed in detail for illustrative purposes, it will be recognized that variations or modifications of the disclosed apparatus lie within the scope of the present invention.

What is claimed is:

1. A method of transmitting a first data packet from a first computer to a second computer over a wide area computer network, said first computer having a first internal network address and a first designated internal port from which it will transmit the UDP data packet and said second computer having a second internal network address and a second designated internal port at which it will receive the UDP data packet, wherein said first computer is protected by a first firewall which translates said first internal network address to a first external network address and said first internal network port to a first external network port when communicating over said wide area computer network, and said second computer is protected by a second firewall which translate said second internal network address to a second external network address and said second internal network port to a second external network port when communicating over said wide area computer network, said first and second firewalls communicating over said wide area computer network, said method comprising:
- a) the first computer identifying the type of the first firewall and the second computer identifying the type of the second firewall;
- b) the first computer predicting the first external network port to be used by the first firewall when the first computer sends the first packet to the second computer and the second computer predicting the second external network port to be used by the second firewall to receive the first packet from the first computer;
- c) said first computer transmitting the first external network address and the predicted first external network port to be used to send the first data packet to said second computer;
- d) the second computer transmitting the second external network address and the predicted second external network port to receive the first data packet to the first computer;
- e) the second computer sending a second data packet to said first computer at said first external network address and said predicted first external network port;
- f) said first computer sending said first data packet to said second computer at said second external network address and said predicted network port.

2. The method of claim 1, wherein step (a) comprises:
- (a.1) said first computer sending four packets, two packets each to first and second servers, each packet addressed to respective first and second ports on one of said servers;
- (a.2) said first and second servers detecting an external port from which each of said packets was sent and sending tat information back to said first computer;
- (a.3) said first computer comparing each of said four external ports from which said packets were sent and if:
  - (a.3.i) each of said external ports are the same, identifying the first firewall as a fixed mapping firewall;
  - (a.3.ii) if each of said external ports is one greater than the previously sent external port, identifying the first firewall as an incremental mapping firewall;
  - (a.3.iii) if each of said external ports from which packets were sent to said first server are the same and are an increment difference from each of said external ports from which packets were sent to said second server, identifying said first firewall as a mixed mapping firewall; and
  - (a.3.iv) if none of (a.3.i) to (a.3.iii) occurs, identifying the first firewall as an unpredictable mapping firewall.

3. The method of claim 2, wherein step (a) further comprises:
- (a.4) said second computer sending four packets, two packets each to third and fourth servers, each packet addressed to respective first and second ports on one of said servers;
- (a.5) said third and fourth servers detecting an external port from which each of said packets was sent and sending that information back to said second computer;
- (a.6) said second computer comparing each of said four external ports from which said packets were sent and if:
  - (a.6.i) each of said external ports are the same, identifying the second firewall as a fixed mapping firewall;
  - (a.6.ii) if each of said external ports is one greater than the previously sent external port, identifying the second firewall as an incremental mapping firewall;
  - (a.6.iii) if each of said external ports from which packets were sent to said third server are the same and are an incremental difference from each of said external ports from which packets were sent to said fourth server, identifying said second firewall as a mixed mapping firewall; and
  - (a.6.iv) if none of (a.6.i) to (a.6.iii) occurs, identifying the second firewall as an unpredictable mapping firewall.

4. The method of claim 3 wherein said data packet send from said first computer to said second computer is part of a UDP data stream.

5. The method of claim 4 wherein if said second firewall blocks said packet from said first computer, said second computer using a source address:port of said packet to send a dummy packet to said first computer.

6. A method for a computer to identify a type of a firewall protecting the computer, comprising:
- (a) the computer sending a first packet to a first server at a first address and a first port; a second packet to said first server at a first address and a second port; a third packet to a second server at a second address and a third port; and a fourth packet to said second server at said second address and a fourth port;
- (b) said first server sending a first message to the computer, said first message containing a first external port from which the computer sent said first packet, and a second external port from which said computer sent said second packet;
- (c) said second sewer sending a second message to the computer, said second message containing a third external port from which the computer sent said third packet, and a fourth external port from which the computer sent said fourth packet;
- (d) said computer comparing said first, second, third and fourth external ports to determine the type of firewall protecting said computer.

7. The method of claim 6, wherein in step (d) if the computer determines said first external port equals said second external port which equals said third external port which equals said fourth external port, then the firewall is determined to be a fixed mapping firewall.

8. The method of claim 7, wherein in step (d) if the computer determines that said second external port is an increment greater than said first external port; and said third external port is said increment greater than said second external port; and said fourth external port is said increment greater than said third external port then the firewall is determined to be a incremental mapping firewall.

9. The method of claim 8 wherein in step (d) if the computer determines that said first external port equals said second external port, said third external port equals said fourth external port; and said third external port is one greater than said first external port, then said firewall is determined to be a mixed mapping firewall.

10. The method of claim 1, wherein step (a) comprises:
- (a.1) said first computer sending a plurality of packets to said first and second servers, each packet addressed to a different port on one of said servers;
- (a.2) said first and second servers detecting an external port from which each of said packets was sent and sending that information back to said first computer;
- (a.3) said first computer comparing each of said external ports from which said packets were sent and if:
  - (a.3.i) each of said external ports are the same, identifying the first firewall as a fixed mapping firewall;
  - (a.3.ii) if each of said external ports is one greater than the previously sent external port, identifying the first firewall as an incremental mapping firewall;

(a.3.iii) if each of said external ports from which packets were sent to said first server are the same and are an incremental difference from each of said external ports from which packets were sent to said second server, identifying said first firewall as a mixed mapping firewall;

(a.3.iv) if none of (a.3.i) to (a.3.iii) comparing said external ports from which said packets were sent and determining the pattern thereof, such that a next external port is predictable; and (a.3.iv) if none of (a.3.i) to (a.3.iv) occurs, and said next external port is not predictable, identifying the first firewall as an unpredictable mapping firewall.

11. A method of transmitting a first data packet from a first computer to a plurality of computers over a wide area computer network, said first computer having a first internal network address and a first designated internal port from which it will transmit the UDP data packet and each of said plurality of computers having an associated internal network address and a designated internal port at which it will receive the UDP data packet, wherein said first computer is protected by a first firewall which translates said first internal network address to a first external network address and said first internal network port to a first external network port when communicating over said wide area computer network, and each of said plurality of computers is protected by an associated firewall which translate said computer's associated internal network address to an associated external network address and said associated internal network port to an associated external network port when communicating over said wide area computer network, said first and plurality of firewalls communicating over said wide area computer network, said method comprising:

a) the first computer identifying the type of the first firewall and each of said plurality of computers identifying the type of the computer's associated firewall;

b) the first computer predicting the first external network port to be used by the first firewall when the first computer sends the first packet to the plurality of computers and each of said computers in the plurality of computers predicting the associated external network port to be used by the associated firewall to receive the first packet from the first computer;

c) said first computer transmitting the first external network address and the predicted first external network port to be used to send the first data packet to each computer in the plurality of computers;

d) each computer in the plurality of computers transmitting the associated external network address and the predicted associated external network port to receive the first data packet to the first computer;

e) each computer in the plurality of computers sending a second data packet to said first computer at said first external network address and said predicted first external network port;

(f) said first computer sending said first data packet to each computer in said plurality of computers at said associated external network address and said predicted network port.

* * * * *

UNITED STATES PATENT AND TRADEMARK OFFICE
CERTIFICATE OF CORRECTION

PATENT NO. : 7,522,594 B2  Page 1 of 1
APPLICATION NO. : 11/220539
DATED : April 21, 2009
INVENTOR(S) : Christopher Piche et al.

It is certified that error appears in the above-identified patent and that said Letters Patent is hereby corrected as shown below:

TITLE PAGE ITEM 75
Inventor Name: delete "Shahadat Khan" and insert -- Shahadatullah Khan --

TITLE PAGE ITEM 73
ASSIGNEE: delete "Eye Ball Networks, Inc." and insert -- Eyeball Networks Inc. --

Signed and Sealed this

Thirtieth Day of March, 2010

David J. Kappos
*Director of the United States Patent and Trademark Office*